May 3, 1966 W. E. RHODES ET AL 3,249,712
PRESSURE RESPONSIVE SWITCH, SUCH AS FOR WATER LEVEL CONTROL
Filed April 20, 1962 3 Sheets-Sheet 1

INVENTORS
WILLIAM E. RHODES
WERNER R. BAUER
BY
Robert R Candor
THEIR ATTORNEY

May 3, 1966 W. E. RHODES ET AL 3,249,712
PRESSURE RESPONSIVE SWITCH, SUCH AS FOR WATER LEVEL CONTROL
Filed April 20, 1962 3 Sheets-Sheet 2

INVENTORS
WILLIAM E. RHODES
WERNER R. BAUER
BY
Robert R Candor
THEIR ATTORNEY

May 3, 1966     W. E. RHODES ET AL     3,249,712
PRESSURE RESPONSIVE SWITCH, SUCH AS FOR WATER LEVEL CONTROL
Filed April 20, 1962     3 Sheets-Sheet 3
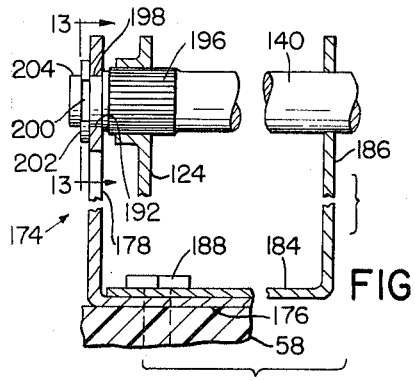
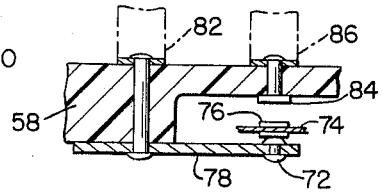
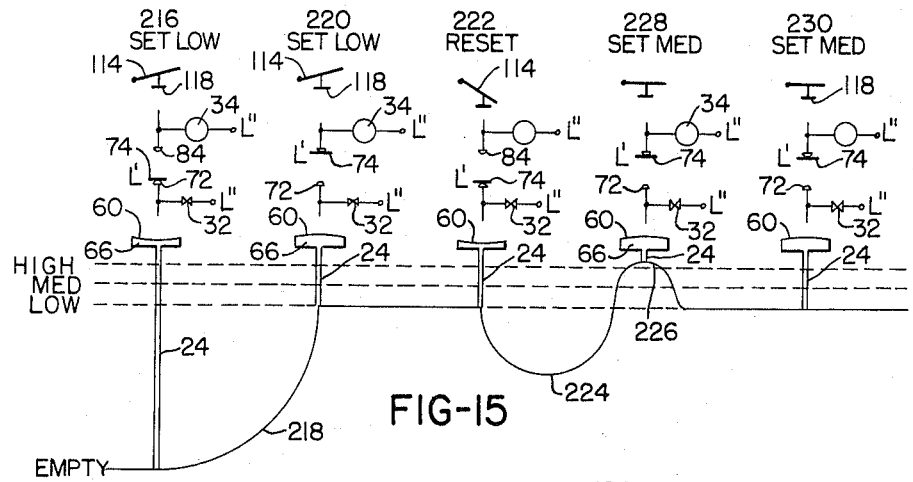
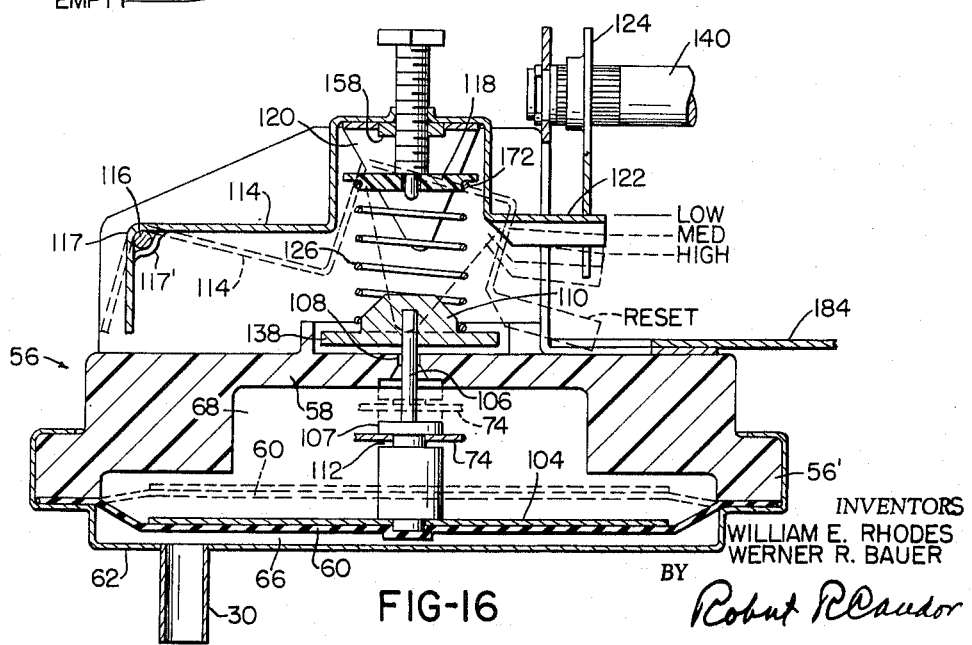
INVENTORS
WILLIAM E. RHODES
WERNER R. BAUER
BY
THEIR ATTORNEY United States Patent Office 3,249,712
Patented May 3, 1966

3,249,712
PRESSURE RESPONSIVE SWITCH, SUCH AS FOR WATER LEVEL CONTROL
William Emerson Rhodes and Werner Robert Bauer, Columbus, Ohio, assignors to Robertshaw Controls Company, a corporation of Delaware
Filed Apr. 20, 1962, Ser. No. 189,050
12 Claims. (Cl. 200—83)

This invention relates to a pressure responsive switch, such as a switch responsive to the water level in a washing machine and the like.

One of the features of this invention includes the use of a pressure chamber, a cushion chamber and a resetting means which insure proper response of the switch to the sustained pressures which are properly to affect the switch, but which prevent undesired responses to sudden pressures which are accidentally produced in the pressure chamber.

Another feature of this invention includes a construction wherein the actuating and rugged parts of the switch may be mounted outside the casing, and only the more delicate parts are mounted within the casing.

Another feature of this invention is to provide a small substantially frictionless rod passing through a snug opening in the casing, to maintain the cushion chamber substantially air tight against quick pressure changes in the cushion chamber, and to transmit the required motion between the parts inside and outside the casing.

Another feature of this invention is to provide a relatively rigid fulcrum blade in the casing which may be spring biased strongly enough to be unresponsive to snap actions of the snap spring, but which may be adjusted by a screw action in an easy manner.

Another feature of this invention includes an effective support construction for the manipulating knob and shaft, which may be easily assembled for quantity production and which may be used, if desired, as a support for the entire switch assembly.

Another feature of this invention includes the use of a double bracket construction to produce the construction for supporting the manipulating knob and shaft which permit assembly of the parts with relatively close fitting tolerances.

Accordnigly, an object of this invention is to provide a switch having one or more of the features herein disclosed.

Another object of this invention is to provide a method of control having one or more of the features herein disclosed.

Other objects are apparent from this description, the appended claimed subject matter, and/or the accompanying drawings, in which:

FIGURE 12 is an enlarged cross section of portions of the cam, cam rod, supporting brackets and part of the switch casing.

FIGURE 13 is a cross section along line 13—13 of FIGURE 12.

FIGURE 14 is an enlarged cross section along line 14—14 of FIGURE 7.

FIGURE 15 is a diagrammatic illustration of the effect of water surge which is prevented by this invention.

FIGURE 16 is an enlarged diagrammatic cross section of certain parts of the switch.

Figure 1:
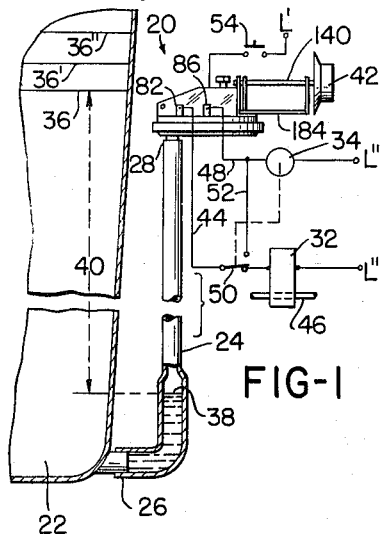
FIGURE 1 is a diagrammatic view of the water level switch connected to a washing machine tub.

Certain words indicating direction, relative position, etc. are used herein for the sake of clearness and brevity. However, it is to be understood that in many cases such relative position, and direction, in actual use, may be entirely different from that described. These words are used to describe the illustrations in the drawings, and are not intended to describe necessarily the actual positions in actual use. Examples of such words are "upper," "lower," "horizontal," "vertical," etc.

According to this invention, a pressure responsive switch, such as a water level responsive switch 20 may be connected, for example, to the tub 22 of a washing machine and the like. The switch 20 may be connected to the tub 22 by means of a pressure tube 24 which may be flexible tube and may be connected to the tub 22 at 26 near the bottom and may be connected to the switch at 28 by means of a nipple 30.

The switch 20 may be responsive to pressure differentials, such as those produced by the heighth of the water in the washing machine tub 22.

When used with a washing machine, the tub 22 initially may be empty and may be gradually filled with water by the opening of a wafer valve 32 under the control of a timer 34.

The switch 20 may be responsive to the pressure produced by the difference in level of water in the tub 22, as indicated at 36 as compared to the level 38 of the water in the tube 24 which traps air under pressure in the upper part of the tube 24. This difference in water levels is indicated by the dotted double arrow 40, and this difference generally is referred to as producing a pressure measured in terms of a certain number of inches of water column.

For example, in automatic washing machines as now used, the water level 36 is often referred to as the "low" fill level and the water column 40 under these conditions may produce 5 inches water column differential.

This water level 36 may be obtained by turning the knob 42 to the "low" position and under these conditions the switch 20 will energize the water valve circuit 44 from the line L', through the water valve solenoid 32, and to the line L". Water will be discharged through the water pipe 46 into the tub 22, and the tub 22 will gradually fill to the level 36 at which time the circuit 44 is de-energized, to de-energize valve 32 and to stop the filling action of the valve 32 when the switch 20 snaps from its empty or low pressure position to the filled or high pressure position. The timer or washing machine circuit 48 is energized when the circuit 44 is de-energized by such snap action of the switch 20. This causes the timer 34 and the washing machine to start the washing cycle, with a filled tub 22.

In automatic washing machines, there are certain operations, such as a spin operation and the like, when the washing machine and the timer are required to be operated notwithstanding that the switch 20 is in a position to energize circuit 44 and to de-energize circuit 48. The circuits which are controlled by the timer 34 are so arranged that a by-pass switch 50 is automatically changed by the timer 34 to produce these operations. Under these conditions, the timer 34 and the washing machine are energized by the circuit 44, through the by-pass circuit 52 which is energized by the changing of the switch 50. When a spin operation is required, with the tub 22 empty, the timer 34 automatically changes the switch 50 to energize circuit 52, the timer itself and the required washing machine circuits and simultaneously to de-energize the water valve 32. This is accomplished by having the switch 50 as a two-position switch, which can energize either the valve 32, or the by-pass line 52 and timer 34 and other washing machine circuits, not shown. However, the illustration in FIGURE 1 is merely a diagrammatic showing of one of the many arrangements which may be used for this type of operation.

The switch 20 may be adjusted by the turning of the knob 42 to select a plurality of different pressures or water levels, as desired. For example, the knob 42 may be turned to "low," "medium" and "high." When the knob is turned to "medium," the tub 22 will be filled to level 36'. Alternatively, the knob 42 may be turned to "high" and then the tub 22 will be filled to the level 36".

The "low" position of the knob 42 may cause the tub to be filled to the lowest recommended filled position 36, which may correspond to a water column of 5 inches as measured at 40.

The medium position of knob 42 may cause the tub to be filled to a medium full position 36' which corresponds to a water column differential of 6.8 inches at 40. The "high" position of the knob 42 may cause the tub to be filled to a filled position at 36", which may correspond to a water column differential of 8.4 inches at 40. These water column heights are given by way of example, however, and other water level heights or other pressures may be selected by the knob 42 as desired. This may be accomplished merely by making certain adjustments, such as by screws 154 and 210, elsewhere described.

The circuit to the timer and to the entire washing machine may be controlled by a master switch 54, if desired.

After the switch 20 has energized the circuit 48, due to a rise in pressure up to a selected pressure produced by the column 40, a substantially lower pressure drop (or "reset" pressure) is required in the tube 24 or the level 36 to cause the switch to snap back to the circuit 44. For example, while it requires a pressure of a water column 8.4 inches to snap the switch up to "high," it requires a drop to a reset pressure corresponding to a column of 5.4 inches or 4.4 inches to cause the switch to snap back from circuit 48 to circuit 44. Also, while it requires a pressure of a water column of 6.8 inches to cause the switch to snap up to the position of circuit 48 when the knob is in "medium," it requires a drop to a reset pressure corresponding to a water column of 3.8 inches, or 2.8 inches to cause the switch to snap down or reset to circuit 44. Likewise, while it requires a pressure of 5 inches water column to cause the switch to snap up from circuit 44 to 48 when the knob 42 is in "low," it requires a drop to a reset pressure of from 2.3 inches to 1.3 inches to cause the switch to snap down from circuit 48 to circuit 44. These pressures are given by way of example only. However, the particular switch being described may be adjusted for other pressures, and other sizes or designs of similar switches may be made to be responsive to entirely different pressures or water columns, as is obvious.

With the pressure examples given, it is to be seen that when the tub 22 has been filled to level 36 with a knob setting of "low," and with the switch in circuit 48 position under a pressure of 5", the user cannot produce a further filling action by turning the knob 42 to "medium" or "high," unless a reset means is provided which first pushes the switch down into the 44 circuit position. Such reset means are provided by construction herein elsewhere disclosed.

The following is the reason why the turning of the knob 42 to "medium" or "high" ordinarily fails further to fill the tub 22 after such tub has been filled with the knob in the "low" position.

When the tub fills to 36, a pressure of 5", water column, in tube 24, causes the switch to snap up to circuit 48. When the knob is then turned to "medium" with such pressure of 5" in the tube, it requires a drop to a pressure of 3.8" or less to cause the switch to drop to the 44 circuit. However, since the tub is filled to produce a pressure of 5", such pressure will not reset or push the switch down, since the 5" pressure is greater than the reset pressure of 3.8" of the "medium" position.

Likewise, such 5" filled pressure is also higher than some of the reset pressures of the "high position," such as the 4.4" value previously given.

After a filling action to 36' with the knob in "medium" with a snap up pressure of 6.8", a subsequent turn of the knob to "high" will not produce a further filling action, since the "high" reset pressure is 5.4" or less.

However, the reset means 120, elsewhere more fully described, automatically moves the switch to reset position 72 every time the knob 42 is changed from any position "low", "medium", or "high" to any other such position.

The switch construction 20 may, if desired, include a generally flat, short cylindrical casing 56 which may be made of a plastic, such as bakelite, and the like. The casing 56 may have a solid wall or upper portion 58 and a generally circular, flexible, pressure operated diaphragm 60 at the other end. The diaphragm 60 may be secured to the casing 50 by a diaphragm cover 62, made of metal or the like, which may be flanged and rolled over at 64 hermetically to form and seal a pressure chamber 66 below the diaphragm 60 and to seal a cushioning chamber 68 above the diaphragm 60.

The pressure chamber 66 is responsive to the pressures produced by the water column differential 40 or by any other pressure source. The cushioning chamber 68 may cushion the diaphragm 60 in such a manner that it prevents the diaphragm 60 from responding to relatively quick pressure surges produced in the chamber 66. Examples of such quick surges are "water bounce" surges elsewhere described, or violent surges such as might be produced by violent agitations in the body of water in the tub 22, etc. The cushioning chamber 68 also may form an enclosure for the snap acting switch mechanism 70 which energizes the circuits 44 and 48.

The snap acting switch mechanism 70 may include a low pressure switch contact 72, which may be contacted or engaged by the snap switch blade 74, with its contact portion 76, when the pressure in chamber 66 is relatively low, as produced by an empty or nearly empty tub 22, so it requires a filling action of the valve 32, or the like. The stationary contact 72 may be carried by a rigid blade 78 which is connected by a bolt 80 to the line connector 82 outside the casing 56, and to which the line or circuit 44 may be connected.

The snap switch blade 74 is movable to a high pressure contact 84, which may be connected by a bolt to the high pressure connector 86 outside the casing 56. The connector 86 may be connected to the line or circuit 48, which is energized under relatively high pressure conditions or filled tub conditions, and which generally require the de-energization of the valve 32 to stop the filling action. Current from contact 84 may cause energization of circuit 48, to energize the timer 34 and the washing machine, to start the washing operation with a full tub of water.

The blade 74 may be energized from the line L' through a connector 88, which extends outside the casing 56 and which is connected by a bolt 90 with the blade 74. The blade 74 then selectively energizes either contact 72 or 84.

The spring fulcrum piece 92 receives one end of the C spring 94. The other end of the spring 94 engages the tongue 96 of the blade 74, to cause the blade 74 to snap back and forth between the contacts 72 and 84 under the actuation of a plunger 98 in response to pressure variations in pressure chamber 66 which are affecting the diaphragm 60.

The plunger 98 engages the pressure member or diaphragm 60 at one plunger end 100, which is received in an opening 102 of a plate 104 of the diaphragm construction 60.

The plunger 98 has a relatively thin rod 106 at its upper end which passes through a snugly fitting opening 108, FIGURE 16, to engage a first spring receiver or cone 110. The plunger 98 also engages the switch blade 74 by means of an intermediate groove 112.

A pivoted lever 114 is pivoted or fulcrumed at 116 above the casing 56, and carries a second spring receiver 118 and a resetter or resetting structure 120. The lever 114 also has a cam actuated part or extension 122 which is actuated by a cam 124.

The resetter has two downward or vertical wings 120 which are supported by a horizontal member 162.

A compression spring 126 oppositely engages the spring receivers 110 and 118, and tends to spread them apart.

Figure 4:
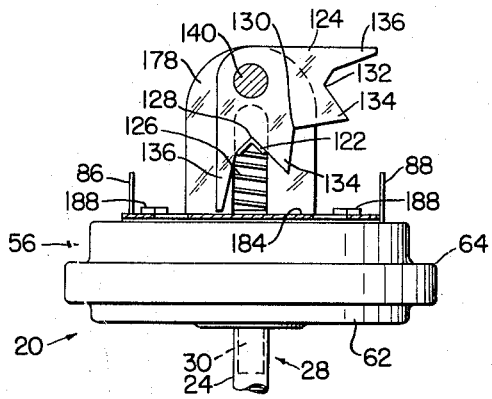
FIGURE 4 is a view along line 4—4 of FIGURE 2.

The manipulator cam 124 has a plurality of pressure adjusting notches 128, 130 and 132, FIGURE 4, separated by the resetting detents 134. The notches 128 and 132 are bounded by the turning limit members 136, which prevent the cam 124 from being turned beyond the limits of the notches 128 and 132.

When the detents 134 pass over the lever end 122, they force the lever 114 down sufficiently to cause the resetter wings 120 to engage the flat portion 138 of the spring receiver 110. This causes the spring receiver 110 to push the plunger rod 106 down sufficiently positively to cause the blade 74 to be reset and to snap over center and engage the reset contact 72 before the cam 124 can be changed from any one of the notches 128, 130 or 132 to any other of such notches. This overcomes the tendency of other switch constructions to be unresponsive to a change of the setting of the adjusting cam from one position to the other after the tub has been filled with water. For example, if the tub has been filled to the level 36, by the original setting of the cam with the notch 128 effective on the rod portion 122, as shown in FIGURE 4, the blade 74 would remain in contact with contact 84 when the cam 124 was changed from position 128 to position 130, since this would merely lower the lever 122 a small amount, but not sufficient to cause the blade 74 to snap down. The long travel of the lever end 122 produced by the reset detent 134 definitely pushes the blade 74 below the snapping position by a definitely long travel of the plunger 98 to its lowest-most position.

A manipulator shaft 140 is connected to the knob 42 and carries the cam 124. The knob 42 may have indications of "low", "medium" and "high", not shown.

The diaphragm 60 has a circular plate 104 which covers the major area of the diaphragm. It may be provided with a small plunger opening 102 in the central part of the plate axially aligned with the first opening or plunger opening 108 in the wall 58, properly to align the plunger 98 in vertical position.

The openings 102 and 108 cooperate to hold the plunger 98 in vertical condition with a snug fit between the rod end 106 and the opening 108, so that practically no air can pass in and out through the opening 108 except very slowly: In view of this, a substantially constant amount of air is maintained in the cushioning chamber 68. This cushioning chamber prevents the diaphragm 60 from responding to sudden changes in the pressure of pressure chamber 66 and thus prevents these sudden changes from actuating the switch blade 74 to change the setting of the switch at a time when it is not desired or necessary to make such a change.

The switch blade 74 and its contact 76 are positively moved down during the resetting action which is produced by any of the detents 134. Also, the switch blade 74 and its contact 76 are positively moved up by the movement of the diaphragm 60. This positive movement of the blade 74 and its contact 76 is produced through the medium of the plunger 98 which acts directly on the blade 74 and causes a positive breaking away of the movable contact 76 from the stationary contacts 72 and 84 as the plunger 98 is positively moved up by the diaphragm 60 and down by the actions of the detents 134. This positive breaking action between the movable contact 76 and the stationary contacts 72 and 84 is sufficient to break any slight welding action that may have taken place between the contacts during the flow of electric current through them. Hence a freely movable condition for the contact 76 is maintained at all times.

The construction which supports the manipulator shaft 140 is so constructed that it lends itself to quick, easy and rugged assembly.

Figure 2:
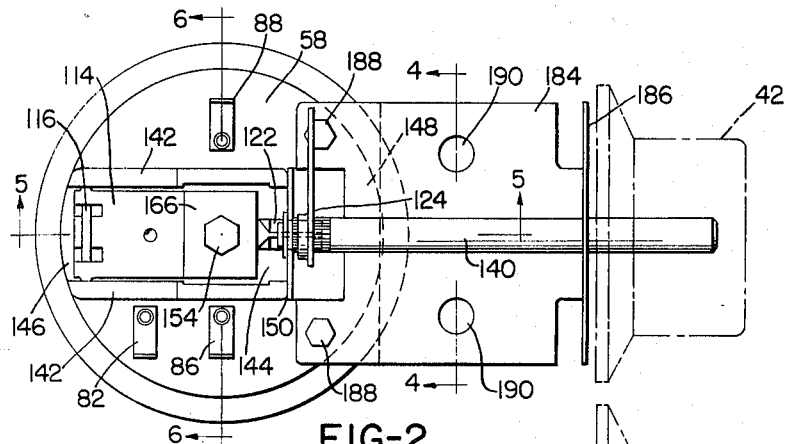
FIGURE 2 is a plan view of the water level switch.
Figure 3:
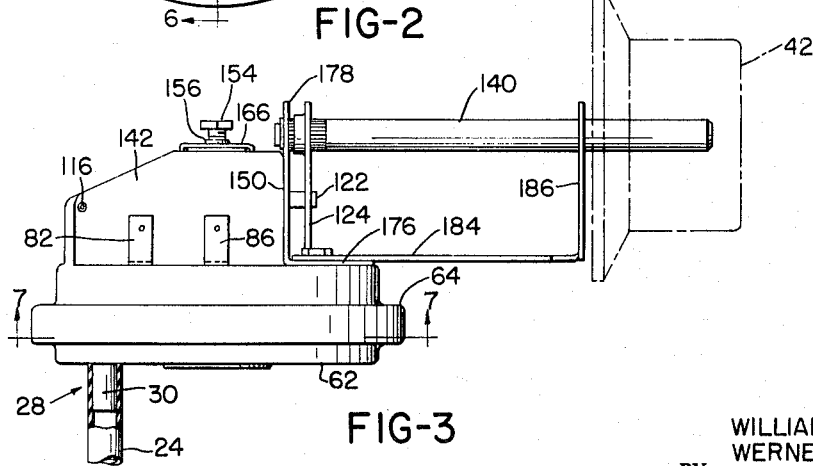
FIGURE 3 is a side view of FIGURE 2.
Figure 5:
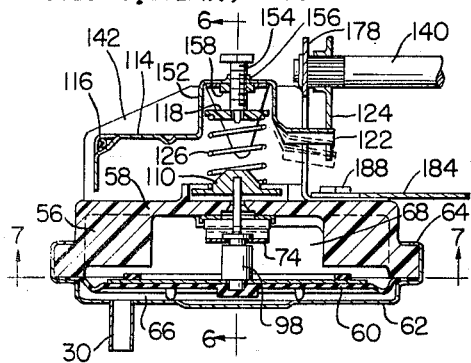
FIGURE 5 is a cross section along line 5—5 of FIGURE 2.
Figure 6:
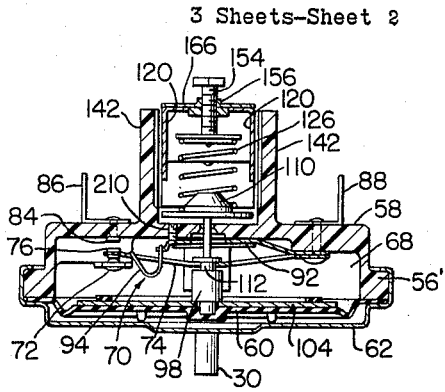
FIGURE 6 is a cross section along line 6—6 of FIGURE 2.
Figures 7, 10:
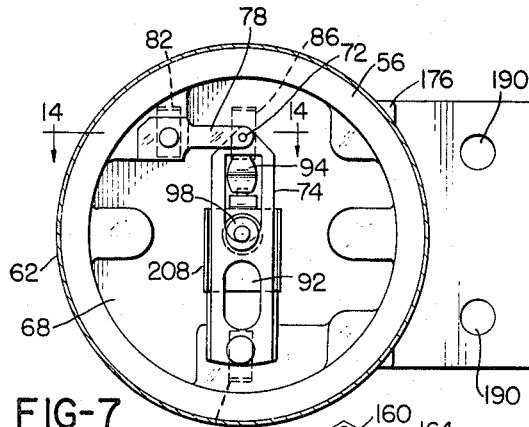
FIGURE 7 is a bottom view along line 7—7 of FIGURE 3.
FIGURE 10 is a perspective view of the resetter.

The generally horizontal circular top 58 of the switch casing 56 may be provided with a pair of parallel fulcrum supporting walls 142, FIGURES 2 and 3, which extend upwardly from the wall 58. They form a channel 144 which extends from a first part 146 of the circumference of the casing 56, and which continues past the center of the top 58 and extends partly to the opposite or second part 148 of the circumference of the casing. The walls 142 have vertical ends 150. The lever 114 is fulcrumed between the walls 142 at 116 and has an elevated spring-receiving and resetter receiving construction 152 over the center of the top of the casing, to form a pocket to receive the upper part of the spring 126. The lever then extends to form the cam follower 122.

The elevated construction 152 receives an adjusting screw 154 which engages the threaded flange 156 of the lever top 166 and then engages a square plastic lock nut 158 which is received in the correspondingly shaped opening 160 in the top portion 162 of the resetter construction 120. The top portion 162 of the resetter 120 may be spot-welded at 164 to the top portion 166 of the lever 114. If desired, the lock nut 158 may be thermally settable firmly to hold the screw 154 in adjusted position. However, if desired, the lock nut may have merely a very tight fit, so that the screw 154 cannot be adjusted out of the correct adjusted position, except with the use of a great force.

The screw 154 has a small extension 168 which is received in the opening 170 in the spring receiver 118.

The spring receiver 118 may have a groove 172, FIGURE 16, to receive the upper end of the spring so that the same may be initially pre-assembled.

The knob 42 and rod 140 may be supported on an easily assembled and effective bracket construction now to be described.

Figures 8, 9, 11:
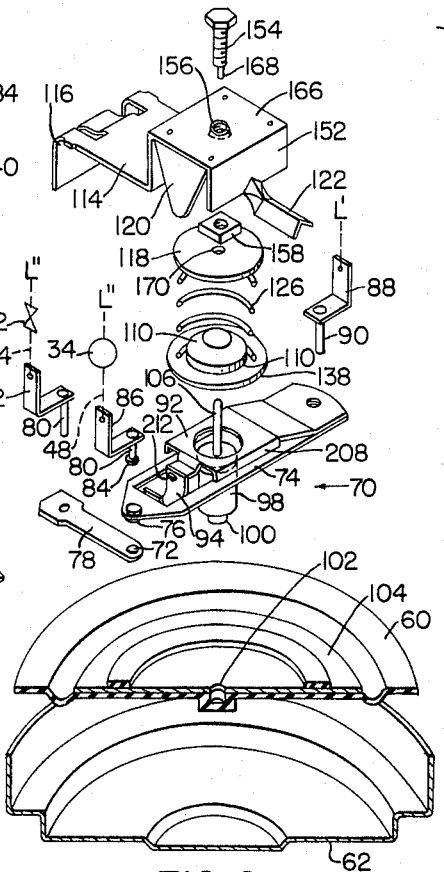
FIGURE 8 is an exploded perspective view of the cam, cam rod and support brackets therefor.
FIGURE 9 is an exploded perspective view of the switch blades, adjusting lever and spring and related parts.
FIGURE 11 is a perspective of the fulcrum switch blade.

A first cam receiving bracket 174, FIGURES 2, 3 and 8, may have a horizontal portion 176 resting on the circular top 58 of casing 56. Bracket 174 may have a vertical wall 178 to be placed adjacent to the vertical ends 150 of the walls 142. The horizontal walls or portions 176 and 178 may have a slot 180 to receive the free end of cam follower 122 of the lever 114.

A second cam receiving bracket 182 may have a horizontal portion 184 resting on the horizontal portion 176 of the bracket 174. The bracket 182 may have a vertical wall 186 which is spaced from and may be parallel to the first vertical wall 178. Bolts 188 may pass through the horizontal portions 176 and 184 and into the casing top 58 firmly to secure and hold the brackets on the top 58.

If desired, openings 190 may be provided in the horizontal portion 184, so that the bracket portion 184 may be used to mount the entire switch construction on any supporting member in the washing machine or the like.

The cam actuating rod 140 may be held in bearing openings 192 and 194 on the vertical walls 178 and 186.

The rod 140 may be fluted at 196, FIGURES 12 and 13, so the cam 124 may be slidably press fitted on the rod 140 to be held in non-rotatable relationship with respect to the rod 140. The rod 140 may be reduced in diameter at 198 to provide a shoulder, to limit the leftward positioning of the rod 140 in the wall 178. The rod 140 may also be provided with a groove 200 to receive the slightly resilient lock washer 202. The washer 202 is prevented from slipping leftward, FIGURE 12, by the increased diameter 204 of the rod 140. The diameters 198 and 204 may be substantially equal and may be of a snug fit into the bearing opening 192, so that the rod can be turned, but without objectionable clearance.

In assembling the rod 140 on the switch construction, the rod may first be inserted in the bearing 192 after the cam 124 has been forced on the rod 140. The diameters 198 and 204 of rod 140 are then passed into the opening bearing 192 and then the lock washer 202 is placed in the groove 200 to lock the wall 178 with the shaft 140. The horizontal portions 176 and 184 may be placed over each other, and then the bolts 188 may be passed through the openings 206 in the horizontal portions 176 and 184 and into the top 58 of the cylinder casing.

The plunger 98 has been so constructed that it is automatically aligned by the opening 102 and 108, and that the snug fit at 108 provides the cushion chamber 68 to prevent the diaphragm 60 from being oversensitive to sudden surges.

The setting of the switch, and its responses to various pressures may be adjusted by adjusting the screw 154 heretofore described, so as to adjust the pressure produced by the spring 126. In addition, the fulcrum piece 92 may be adjusted to determine the nature of the snap action of the blade 74. To this end the fulcrum piece 92 may be of sturdy sheet metal and may be provided flanges 208 to increase its stability. It is held in place by bolt 90 and is so shaped that it is upwardly biased in a strong manner against the bottom of the wall 58. An adjusting screw 210 may be provided which may be adjusted to push the fulcrum piece 92 downwardly to adjust the vertical position of the tongue 212 with respect to the tongue 96 which tongues receive the respective ends of the C spring 94.

The tongue 212 may be moved up or down by adjusting the screw 210. Tongue 212 may be adjusted down far enough so switch blade 74 is completely biased into an up position against contact 84. The tongue 212 may also be adjusted far enough up so the blade 74 is completely biased in a down position against the contact 72. The tongue 212 may also be adjusted in an intermediate position so the switch blade 74 remains up against contact 84 if snapped upwardly, or remains down against contact 72 if snapped downwardly. This adjustment of screw 210 may be performed from outside the casing 56 after the switch and diaphragm parts have been assembled.

Hence the switch construction herein disclosed may be used to be responsive to any selected pressures above atmosphere, below atmosphere, or both below and above atmospheric pressure. It may be used as a pressure switch or as a vacuum switch and may be adjusted or may be constructed to perform any of these functions.

FIGURE 15 indicates how the sung fit of the rod 106 in the opening 108 prevents "water bounce" response in the switch or any other undesirable response to any other surge that may be produced in the pressure chamber 66. The pressure chamber 66 is diagrammatically indicated at 66 in FIGURE 15, the pressure tube 24 is also diagrammatically indicated, but only those portions of tube 24 are shown which are pertinent to this problem. Other parts of the switch will be recognized by identical reference numerals.

At the position or stage 216, the lever 114 has been set to "low" position while the tub 22 is empty. This has caused the blade 74 to move down because of the low pressure in the pressure chamber 66 and has energized the contact 72 thereby opening the valve 32 to start the filling action of the tub 22. The curved line 218 shows the rise of water column pressure in tube 24. As the tub fills the curve 218 rises until it reaches 5″ at stage 220 when the pressure in the tube 24 causes the diaphragm 60 to move up and move the blade 74 into contact with contact 84. This closes the water valve 32 and normally will start the timer 34. The user then decides that the water level in the tub at 36 is not sufficiently high and turns the knob 42 to the "medium" position from the previous low position. In doing so, one of the reset detents 134, FIGURE 4, pushes the diaphragm 60 down to its extreme low position so that the switch blade 74 snaps quickly down to energize the contact 72 and to open the valve 32 for further filling. The quick movement of the lever 114 to a down position in stage 222 when the knob 42 has been turned, has produced a quick downward movement of diaphragm 60 and a downward surge of the air in tube 24 to push the water in tube 24 downwardly in a manner which is illustrated by the curve 224 which, however, may not be representative of the pressures within the tube.

However, this quick motion of the lever 114 and diaphragm 60 produces a "water bounce" which is illustrated at 226 in station 228. The action illustrated at 228 is an action that would take place except for the fact that the cushioning chamber 68 is sealed substantially by the snug fit of the opening 108. If this snug fit were not present, the diaphragm 60 would bounce upwardly and cause the blade 74 to engage the contact 84 instead of remaining with the contact 72. As shown in station 228, it is not possible for the valve 32 to be opened to further fill the tub 22 to the level 36′ as desired by the user. Instead the valve 32 remains closed and thus does not add any water to the tub 22 notwithstanding that the knob 42 is set at "medium." Therefore, when the knob remains at medium as indicated at stage 230 the water level remains at low level 36 instead of at the wanted medium level 36′. However, with the surge chamber 68 properly sealed, so that it is a cushioning chamber, and according to this invention, this upward bounce of the blade 74 is prevented, and the diaphragm 60 remains in a down position, so that water may be added by the valve 32 until the tub 22 is filled to the desired medium level 36′, as desired by the user.

It is thus to be seen that a very efficient and rugged switch construction has been provided which lends itself to quantity production, with the use of quantity producing machinery as well may be appreciated by those skilled in the art.

Thus, the rigid electrically insulating hermetic casing 56 of bakelite or the like, has a fixed end wall 58 with a small opening 108 and has a diaphragm receiving open end or rim 56′. An electrically insulating diaphragm 60, of rubber or the like, which has inner and outer sides with respect to casing 56, seals the open end or rim 56′. The diaphragm has a plunger receiving irregularity or opening 102 which is aligned with the small opening 108. A switch 70 is provided in the casing 56 which has an actuating switch member or blade 74. This member 74 is movable to a high pressure switch position in contact with contact 84 and to a low pressure or reset position in contact with contact 72. A sealing cover 62 forms a pressure chamber 66 adjacent the outer side of the diaphragm 60, and seals the diaphragm to the casing rim 56′ with the curled edge 64.

A plunger 98 is provided with a relatively large inner portion in the casing 56 and with a relatively small end or end portion 106 which extends outside the casing. The plunger 98 is made of self lubricating and electrically insulating material, such as nylon. The small end portion passes snugly through the relatively small opening 108 with substantially no friction, but with such a small clearance that a substantially sealed cushioning chamber 68 is formed in the casing 56 on the inner side of the diaphragm 60. The small amount of air which can pass between the adjacent walls of the opening 108 and of the plunger end portion 106 is so small that it is negligible as compared to the larger volume of cushioning air inside the chamber 68. Hence the chamber 68 acts as a cushion against sudden inward movements of the diaphragm 60 which might otherwise be produced by sudden pressure surges in the tube 24 and pressure chamber 66.

The larger inner portion of the plunger 98 is locked by engagement with the irregularity or opening 102 so the plunger is properly aligned within the casing 56.

An intermediate portion 112 of the plunger 98 actuatingly engages the actuating switch member or blade 74 to move the switch in response to pressures created in pressure chamber 66.

Spring means 126 are provided and are carried by the fixed end wall 58 outside the small opening 108. The spring means 126 inwardly presses the outer end 106 of the plunger 98 and the pressure exerted by such spring 26 determines the response of the switch to the pressures in the pressure chamber 66.

Adjustable actuating means outside the cushion chamber are provided for adjusting and selecting the pressure of the spring on the plunger 98 and thereby to adjust and select the pressures to which the switch 70 responds.

Such adjustable actuating means may include the lever 114 with its adjustable screw and with its cam actuated part 122.

Such adjustable actuating means may also include the selecting cam 124 with its pressure adjusting notches 128, 130, and 132 and its resetting detents 134.

Such adjustable actuating means may include the manipulator shaft 140, the knob 42 and the two brackets 174 and 182.

The plunger rod 106 has an abutment 107 which limits the outward or upward movement of the plunger 98 when abutment 107 engages rigid wall 58.

The construction is such that the casing 56, with its rigid wall 58 at one end and with its pressure responsive diaphragm at the other end, may be assembled with the switch construction 70 in said casing 56 and with the plunger 98 connected to said switch construction 70 at 112 and connected to said diaphragm at 102. The assembly may also include the plunger end rod 106 extending out of the casing 56 snugly through the opening 108 in the rigid wall 58, and with the end rod 106 having an abutment 107 inside the casing limiting the outward movement of the end rod 106. This produces a unitary structure which may be completely assembled and tested.

At any stage of assembly the lever 114 may be mounted on the rigid wall 58 to be placed in adjusting engagement with the spring construction 126 and 110 which engages said end rod 106 outside the casing 58.

Thereafter the adjusting cam construction 124, etc., may be mounted on the rigid wall 58 in engagement with the lever 114 and its cam follower 122.

The lever 114 may be hinged by a rivet pin 116 which passes between the bent portions 117 and 117' which are formed on lever 114.

The lever may swing up about pin 116 to move in and out of alignment with the rod end 106. This may be done before complete assembly, or for adjustment after assembly, to permit access to adjusting screw 210.

The adjusting screw 210 is carried by rigid wall 58 and is adjustable from outside the casing 56 before the lever construction 114 has been attached to wall 58. The screw 210 may also be adjusted while the lever construction 114 has been swung up about hinge pin 116 out of alignment with the screw 210.

It is thus to be seen that the casing 56, diaphragm 60, cover 62, switch assembly 70, plunger 98 and plunger rod end 106 may be completely assembled and tested as a unit. The hinged rod 114 may be secured to the rigid wall 58 at any desired stage of assembly.

Then the adjusting cam construction 124, 140, etc., and the supporting bracket constructions 174 and 182 may be applied to complete the entire assembly.

All of the foregoing parts are so shaped and related to each other that the parts may be easily made by high speed and relatively simple production machinery. They also may be quickly, accurately, and easily assembled by high production methods.

After manufacture of the switch assembly, such assembly can be accurately calibrated at the factory. The user can easily make the adjustments and pressure selections which provide satisfactory performance.

A new and useful pressure switch has thus been provided.

While the form of the invention now preferred has been disclosed as required by the statutes, other forms may be used, all coming within the scope of the claims which follow.

What is claimed is:

1. In combination: a rigid electrically insulating casing made of air impervious material and having a fixed end wall with a small opening and having a diaphragm receiving open end; an electrically insulating diaphragm, having inner and outer sides, sealed to said casing adjacent said open end, and having a plunger receiving irregularity on said inner side aligned with said small opening; a switch in said casing having an actuating switch member movable to a high pressure switch position and to a low pressure switch position; means forming a pressure chamber adjacent said outer side of said diaphragm; a self lubricating and electrically insulating plunger with a large inner portion in said casing and with a small end outside said casing, said inner portion being locked by said irregularity, said plunger having an intermediate portion engaging said actuating switch member, said plunger having its small end passing through and snugly fitting said small opening to form a substantially sealed cushioning chamber on said inner side of said diaphragm; spring means carried by said fixed end wall outside said small opening and inwardly pressing said outer end of said plunger; and adjustable actuating means outside said cushion chamber adjusting the pressure of said spring on said plunger.

2. In combination: a rigid electrically insulating casing made of air impervious material and having a fixed end wall with a small opening and having a diaphragm receiving open end; an electrically insulating diaphragm, having inner and outer sides, sealed to said casing adjacent said open end, and having a plunger receiving irregularity on said inner side aligned with said small opening; a switch in said casing having an actuating switch member movable to a high pressure switch position and to a low pressure switch position; means forming a pressure chamber adjacent said outer side of said diaphragm; a self lubricating and electrically insulating plunger with a large inner portion in said casing and with a small end outside said casing, said inner portion being locked by said irregularity, said plunger having an intermediate portion engaging said actuating switch member, said plunger having its small end passing through and snugly fitting said small opening to form a substantially sealed cushioning chamber on said inner side of said diaphragm; and spring means carried by said fixed end wall outside said small opening and inwardly pressing said outer end of said plunger.

3. A combination according to claim 2 in which a lever adjusts the pressure of said spring means.

4. A combination according to claim 2 in which a cam adjusts the pressure of said spring means.

5. A combination according to claim 2 in which the position of a lever adjusts the pressure of said spring means, the position of a cam adjusts the position of said lever and a rod and knob adjust the position of said cam.

6. A combination according to claim 5 in which two cam and rod receiving brackets support said cam, rod and knob on said fixed end wall of said casing.

7. A combination according to claim 2 in which a plurality of selectable positions of said cam member adjust the pressure of said spring means to a plurality of pressure actions on said plunger.

8. A combination according to claim 7 in which said cam has resetting means to reset said switch upon movement of said cam from any one of said selectable positions to any other of said selectable positions.

9. In combination: a switch chamber having a manipulator end wall at one end and a diaphragm receiving end; a switch in said switch chamber having two spaced stationary contacts and a movable contact movable by snap action between said stationary contacts to a high pressure position and a low pressure position, said movable contact being carried by a movable contact spring blade; means forming a pressure chamber adjacent said diaphragm end of said switch chamber; a diaphragm secured to said diaphragm receiving end between said switch chamber and said pressure chamber; a plunger connected to said diaphragm, connected to said spring blade to snap said movable contact to said high pressure position and to said low pressure position, said plunger having a plunger end extending through said manipulator end wall; a first spring receiver continuously abutting said plunger end above said manipulator end wall; a spring actuating lever with a fulcrum supported on said manipulator end wall and having a free lever end; a second spring receiver carried by said lever; a compression spring between said receivers; and reset means carried by said lever and engaging said spring receiver.

10. In combination: a switch chamber having a manipulator end wall at one end and a diaphragm receiving end; a switch in said switch chamber having two spaced stationary contacts and a movable contact movable by snap action alternately to and from said stationary contacts between a high pressure position and a low pressure position said movable contact being carried by a movable contact spring blade; means forming a pressure chamber adjacent said diaphragm end of said switch chamber; a diaphragm secured to said diaphragm receiving end between said switch chamber and said pressure chamber; a plunger connected to said diaphragm, directly connected to said spring blade alternately and positively to snap said movable contact to and from said stationary contacts between said high pressure position and said low pressure position, said plunger having a plunger end extending through said manipulator end wall; a plunger adjusting lever supported on said manipulator end wall having a spring pressure connection with said plunger end and a positive reset connection with said plunger end and having a free lever end; and adjusting shaft supported on said switch chamber having a cam adjusting said free lever end and having a plurality of spring pressure adjusting surfaces adjusting said lever end to cause said switch to be responsive to a plurality of different relatively high pressures in said pressure chamber, said cam having a reset surface actuating said free end to cause said plunger to reset said switch and positively to move said plunger end, said spring blade and movable contact from one of said stationary contacts.

11. In combination: a switch casing; a switch in said casing; a generally flat support on said casing; a first cam receiving bracket having a first flat supporting plate to rest on said flat support and having a first bearing wall transverse to said supporting plate; a second cam receiving bracket having a second flat supporting plate to rest on said first flat supporting plate and having a second bearing wall; bolts passing through said plates and into said flat support; a cam actuating rod held in bearings on said bearing walls against longitudinal movement in one of said bearings in one of said bearing walls and axially free in the other bearing in the other of said bearing walls; a cam on said rod; and a cam follower independent of said rod and actuated by said cam; and means actuated by said follower and actuating said switch.

12. In combination: an electrically insulating casing having a fixed wall at one end with a relatively small opening and having a pressure responsive diaphragm at the other end to form a combined switch enclosure and cushion chamber; a switch in said chamber with an actuatable switch member; a self-lubricating and electrically insulating plunger engaging said diaphragm and said actuatable switch member in said chamber and having a relatively small end protruding out of said chamber and passing through and snugly fitting said relatively small opening; a compression spring construction outside said chamber and engaging said protruding end to regulate the response of said switch to said diaphragm.

References Cited by the Examiner
UNITED STATES PATENTS

| | | | |
|---|---|---|---|
| 2,636,093 | 4/1953 | Clark et al. | 200—83 |
| 2,681,957 | 6/1954 | Schneider | 200—83 X |
| 2,921,159 | 1/1960 | Elderton et al. | 200—83 |
| 2,934,618 | 4/1960 | Beller et al. | 200—83 |
| 2,993,963 | 7/1961 | Beardow | 200—30 |
| 3,055,994 | 9/1962 | Lundeen | 200—83 |
| 3,064,094 | 11/1962 | Marchi | 200—83 |

BERNARD A. GILHEANY, *Primary Examiner.*

E. JAMES SAX, *Examiner.*

S. B. SMITH, JR., H. M. FLECK, *Assistant Examiners.*